UNITED STATES PATENT OFFICE 2,464,785

MONAZO COMPOUNDS CONTAINING A THIAZOLONE CYANINE DYE COMPONENT

Thomas R. Thompson, Binghamton, N. Y., assignor to General Aniline & Film Corporation, New York, N. Y., a corporation of Delaware No Drawing. Application November 18, 1947, Serial No. 786,812

4 Claims. (Cl. 260—158)

The present invention relates to water-soluble and water-insoluble monazo compounds which comprise, as one component, the radical of a thiazolone cyanine dye, and as the other component, the radical of a diazotizable amine, i. e., aromatic or heterocyclic amine.

The monazo compounds are characterized by the following general formula:

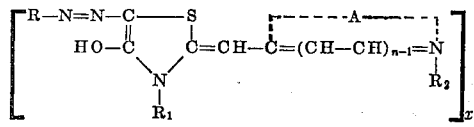

in which A represents the residue of a heterocyclic nitrogenous nucleus of the type common in cyanine dyes, e. g., oxazole, thiazole, selenazole, and their polycyclic homologues, such as those of the benzene, naphthalene, acenaphthene and anthracene series, pyridine and its polycyclic homologues, such as quinoline and α-β-naphthaquinolines, indolenines, diazines, such as pyrimidines and quinazolines, thiazolines and selenazolines (the polycyclic compounds of this series may also be substituted in the carbocyclic rings with one or more groups such as alkyl, i. e., methyl, ethyl, etc., aryl, i. e., phenyl, amino, hydroxy, alkoxy, i. e., methoxy, ethoxy, etc., and methylene-dioxy groups, or by halogen, i. e., chlorine, bromine, or iodine atoms), $n$ represents 1 or 2, R represents a substituted or unsubstituted aryl group of the benzene, naphthalene, anthracene and phenanthracene series, or heterocyclic group, e. g., pyrrole, pyrazole, pyrazolone, carbazole, primuline, etc., with or without water-solubilizing groups, such as sulfonic acid or carboxylic acid groups, $R_1$ represents an alkyl, allyl, aryl or aralkyl group, e. g., methyl, ethyl, propyl, phenyl, naphthyl, tolyl, benzyl and the like, $R_2$ represents an aliphatic radical, e. g., methyl, ethyl, propyl, butyl, hydroxyethyl, ethoxyethyl or an aralkyl radical e. g., naphthylmethyl, benzyl, and the like, and X represents an acid radical, e. g., chloride, bromide, iodide, or alkyl sulfate, alkyl p-toluenesulfonate or perchlorate.

The monazo compounds illustrated by the foregoing general formula are obtained by coupling any diazotized amine of the type common in azo dye chemistry, with a thiazolone cyanine dye of the general formula:

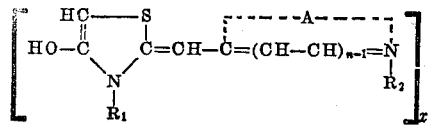

wherein A, $n$, $R_1$, $R_2$ and X have the same values as above.

The thiazolone cyanine dyes characterized by the foregoing formula are prepared according to the method described in application Serial No. 786,814, filed on November 18, 1947. In general, the method consists of condensing a substituted thioamide with a α-halogen or α-dihalogen acetic acid, or with a α-halogen propionic acid. The compounds, in view of their keto-methylene configuration, undergo keto-enol tautomerism, i. e., the keto group enolizes to form a hydroxyl group. In other words, one of the hydrogens of the methylene group shifts back and forth between the methylene and keto groups of the keto-methylene configuration.

The following examples describe the preparation of some of the thiazolone cyanine dyes utilized in the preparation of the monazo compounds.

*Example I*

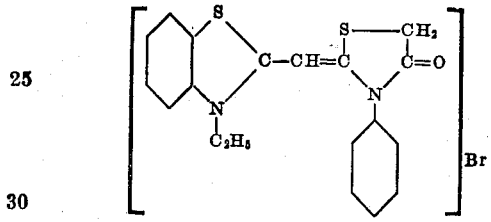

A mixture of 25 grams of α-(3-ethylbenzothiazolylidene) thioacetanilide and 25 grams of bromacetic acid was heated in 50 cc. of n-butanol for ten minutes at 110° C., the solution becoming deep yellow in color. The mixture was cooled, stirred with ether, filtered, and washed with ether. The residue was dried at 80° C. to yield 34.9 grams of a solid, melting at 231–236° C. A ten gram fraction of this was recrystallized from methanol to yield 7.7 grams of the final dye, melting at 233–234° C.

*Example II*

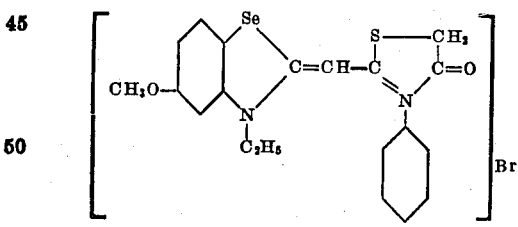

A mixture of 4.11 grams of α-(3-ethyl-5-methoxybenzo-selenazolylidene) thioacetanilide, 4.11 grams of bromacetic acid, and 45 cc. of n-butanol was heated at 90° C. for twenty minutes and at 110° C. for ten minutes. The thick slurry of greenish crystals was thinned with three volumes of ether and filtered to yield 5.0 grams of a product, melting at 283–284° C.

*Example III*

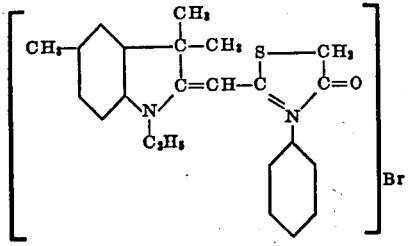

6.9 grams of α-(1-ethyl-3,3,5-trimethylindolinylidene) thioacetanilide were heated with 6.9 grams of bromacetic acid in 25 cc. of n-butanol at 105–110° C. for ten minutes. The mixture was treated with ether and the ether layer decanted. The black liquid was stirred with isopropanol and filtered. The residue was recrystallized from methanol to yield 1.7 grams of the final dye having a melting point at 236–238° C.

*Example IV*

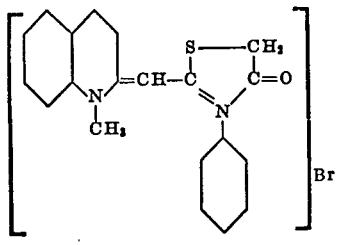

A mixture of 5.5 grams of α-(1-methyl-2-quinolylidene) thioacetanilide and an equal weight of bromacetic acid was dissolved in 50 cc. of n-butanol and heated at 100° C. for ten minutes. On cooling, yellow crystals formed which were filtered and washed with ether. Recrystallization from methanol yielded yellow crystals melting at 212° C.

*Example V*

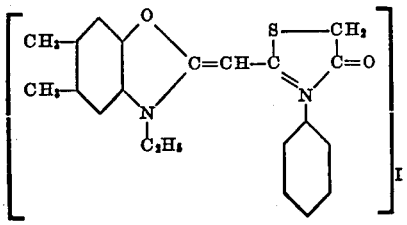

A mixture of 5 grams of α-(3-ethyl-5,6-dimethylbenzoxazolylidene) thioacetamide, 5 grams of bromacetic acid and 5 cc. of acetic acid was heated at 95° C. for thirty minutes. After cooling, the product was precipitated with ether. The semi-solid precipitated product was refluxed with 40 cc. acetone containing 5 grams of sodium iodide. After cooling, the light yellow product was filtered and dried at 80° C., to yield 3.5 grams of a solid which melts above 290° C.

In preparing the monazo compounds, the above thiazolone cyanine dyes are coupled with a diazonium salt in the usual manner. Any primary aromatic or heterocyclic amine capable of undergoing the diazotization reaction may be employed in the preparation of the diazonium salt. As examples of illustrative amines, the following may be mentioned:

Aniline
p-Chloroaniline
2,5-dichloroaniline
Aminoazobenzene
α-Naphthylamine
p-Nitroaniline
o-Nitroaniline
3-nitro-4-toluidine
2-nitro-4-chloroaniline
2,4-dinitroaniline
Sulfanilic acid
1-amino-2-naphthol sulfonic acid
p-Aminodiphenylamine
Benzidine
1-naphthylamine-6-sulfonic acid
α-Naphthylamine
Aniline-2,5-disulfonic acid
1-naphthylamine-7-sulfonic acid
2-chloro-4-aminobenzoic acid
Benzidine-2,2'-disulfonic acid
2-amino-4-sulfobenzoic acid
Primuline
2,6-diaminotoluene-4-sulfonic acid
3-aminobenzoic acid
2-amino-8-naphthol-3,6-disulfonic acid
1,4-diaminonaphthalene-3-sulfonic acid
Dianisidine
Tolidine
p-Aminobenzyldiethylamine
2-ethoxybenzidine
o,o'-Diaminodiphenic acid
Diaminocarbazol
Benzidine-2,2'-disulfonic acid
3,3'-dichlorobenzidine
2-nitrobenzidine
4,4'-diaminostilbene-2,2'-disulfonic acid
4,4'-diamino-2,2'-tetramethyltriphenylmethane
2-aminobenzothiazole
2-amino-6-ethoxybenzothiazole
2-aminobenzoxazole
4,4'-diaminodiphenylurea-3,3'-disulfonic acid
4,4'-diamino-diphenylmethane
2-(p-phenylamino)-6-methylbenzothiazole
4-aminoperimidine-5,8-disulfonic acid The following examples illustrate the preparation of the monazo compounds of my invention.

*Example VI*

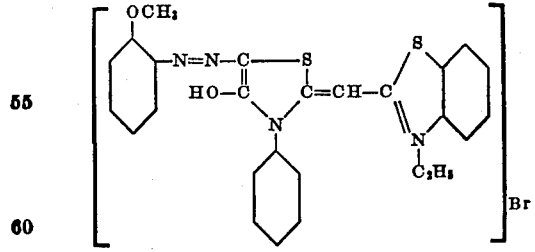

A mixture of 0.6 gram of o-anisidine, 10 cc. of water, 20 grams of ice, and 5 cc of hydrochloric acid (6N) was diazotized with a solution of 0.4 gram of sodium nitrite in 5 cc. of water. The resulting o-anisidine diazonium chloride solution was added to a solution of 2 grams of 3-ethyl-3'-phenyl-4'-hydroxythiazolothiacyanine bromide of Example I in 10 cc. of methanol, followed by 8 cc. of sodium hydroxide solution (6N). The reaction mixture became blue-purple in color and the product, which separated, was filtered and washed with water to yield 1.9 grams of the azo dye. An alcoholic solution of this dye is blue. The blue color turns yellow on addition of acids (acetic, sulfuric, or hydrochloric) and the yellow color is changed to blue on addition of alkali (sodium hydroxide, sodium carbonate, or triethylamine).

When the keto-methylene cyanine dye is coupled with diazotized sulfanilic acid, (a blue-purple, alkali soluble, dyestuff is obtained.

*Example VII*

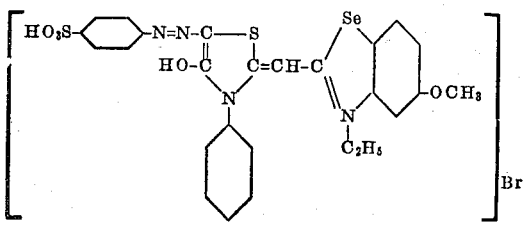

A mixture of 0.8 gram of sulfanilic acid, 10 cc. of water, 20 grams of ice and 5 cc. of sulfuric acid (6N) was diazotized with a solution of 0.4 gram of sodium nitrite in 5 cc. of water. The resulting diazonium solution was added to a suspension of 2 grams of the thiazolone cyanine dye of Example II in 30 cc. of methanol, 8 cc. of sodium hydroxide (6N) were added and the mixture stirred for thirty minutes. The blue-green solution was neutralized with acetic acid and the dye filtered. The product is insoluble in water, but dissolves in the presence of alkali to yield a deep greenish-blue solution. The dye is moderately soluble in methtanol and gives a greenish-blue solution.

*Example VIII*

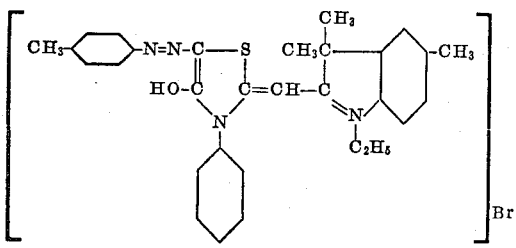

A mixture of 0.6 gram of p-toluidine, 10 cc. of water, 20 grams of ice, and 5 cc. of hydrochloric acid (6N) was diazotized with a solution of 0.4 gram of sodium nitrite in 5 cc. of water. The resulting diazonium salt solution was added to a solution of 2 grams of the thiazolone cyanine dye of Example III in 30 cc. of methanol. After the addition of 8 cc. of sodium hydroxide (6N), the reaction mixture became blue and the dye separated. The dyestuff is very slightly soluble in water, but dissolves in organic solvents such as ethyl alcohol to yield a deep blue solution.

*Example IX*

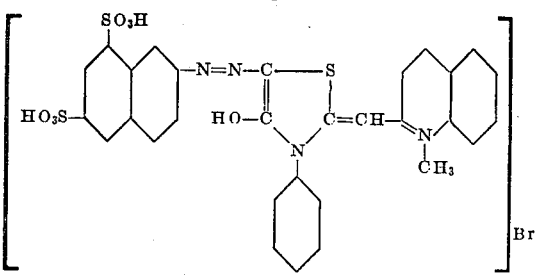

A mixture of 1.6 grams of 2-naphthylamine-6,8-disulfonic acid, 10 cc. of water, 20 grams of ice and 5 cc. of hydrochloric acid (6N) was diazotized with a solution of 0.4 gram of sodium nitrite in 5 cc. of water. The resulting diazonium salt solution was added to a solution of 2 grams of the thiazolone cyanine dye of Example IV, dissolved in 20 cc. of methanol, followed by 8 cc. of sodium hydroxide (6N). The resulting mixture became green and the product was precipitated by the addition of 100 cc. of salt water (15%) containing 5 cc. of hydrochloric acid. After filtration and washing with salt water, the dye dissolves in water and ethyl alcohol to yield a green-blue color.

*Example X*

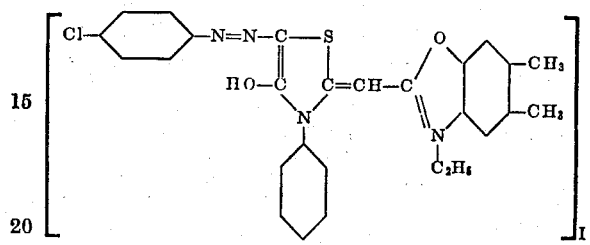

A mixture of 0.6 gram of p-chloroaniline, 10 cc. of water, 20 grams of ice, and 5 cc. of hydrochloric acid (6N) was diazotized with a solution of 0.4 gram of sodium nitrite in 5 cc. of water. The resulting diazonium salt solution was added to a solution of 2 grams of the thiazolone cyanine dye of Example V, in 20 cc. of methanol, followed by 8 cc. of sodium hydroxide (6N). A red color developed and after the addition of 10 cc. of an aqueous potassium iodide (50%) solution, the product was filtered. The dyestuff is slightly soluble in water and benzene, but soluble in ethyl alcohol to give a deep red solution.

*Example XI*

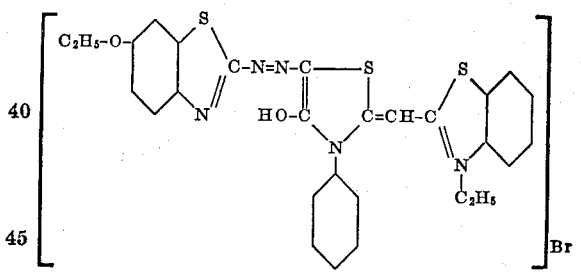

A mixture of 1.9 grams of 2-amino-6-ethoxy-benzothiazole, 50 cc. of water, 50 grams of ice, and 15 cc. of hydrochloric acid (6N) was diazotized with a solution of 0.7 gram of sodium nitrite in 5 cc. of water. A solution of 4 grams of the thiazolone cyanine dye of Example I in 50 cc. of 50% aqueous methanol was added, followed by the dropwise addition of 5 cc. of triethylamine. The dye was filtered, washed with water, and purified by recrystallization from methanol. The dyestuff is insoluble in water and moderately soluble in methanol to yield a deep blue solution having an absorption maximum at 583 mµ.

The above dye salts may be converted to salts other than halogen salt by treating the halogen salt with an alcohol solution containing a sodium or potassium salt of perchloric or thiocyanic acid.

The azo compounds of the invention are useful in many commercial applications. The dyes, both water-soluble and water-insoluble, may be used in the silver dye bleach process of color photography wherein dye images are formed by the selective destruction of the dyes in the presence of silver images. They may also be used as filter or anti-halation dyes in light-sensitive photographic film.

The water-insoluble azo dyes, especially those devoid of sulfonic and carboxylic acid groups, are valuable for the coloration of hydrolyzed and unhydrolyzed organic derivatives of cellulose such as cellulose acetate, cellulose formate, cellulose propionate, or cellulose butyrate, and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose, by dyeing, printing, stenciling, or like methods well known in the art.

The azo dyes, whether water-soluble or water-insoluble, can be employed to color textile materials such as wool, cotton, silk, cellulose acetate silk, and the like. Dyeings are made by making an aqueous dispersion of the azo dye in water, usually with the aid of a dispersing agent, such as soap. These dispersions may be made in the manner similar to known methods of making dispersions of other water-insoluble acetate rayon dyes. The dyed materials show good fastness to light and washing.

Instead of dyeing cotton by employing an aqueous dispersion of the azo dye, the dye may be developed in cotton fabrics by impregnating cotton cloth in an aqueous solution of the thiazolone cyanine dye containing a wetting agent and caustic soda. The impregnated fabric is then dried and developed in a neutral solution of a diazonium salt, rinsed in cold water, soaped at the boil, rinsed and dried. The shade of the dye will depend, of course, upon the coupling component and the diazo component utilized in the development. Such dyed cotton fabrics have good fastness properties and are fast to soda-kier boiling.

While the present invention has been described in considerable detail with reference to certain preferred procedures, materials and uses, it is understood that the invention is not limited thereto and that numerous variations may be made in the procedures herein described, that equivalent diazo components may be substituted, and that many uses other than those mentioned are contemplated.

I claim:

1. Azo dyestuffs having the general formula:

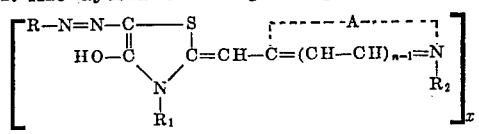

wherein A represents the residue of a heterocyclic nitrogenous nucleus of the type common in cyanine dyes, $n$ represents an integer from 1 to 2, R represents the radical of a diazotizable amine, $R_1$ represents a member selected from the class consisting of alkyl, allyl, aryl and aralkyl groups, $R_2$ represents a member selected from the class consisting of alkyl and aralkyl groups, and X represents an acid radical.

2. The azo dye having the formula:

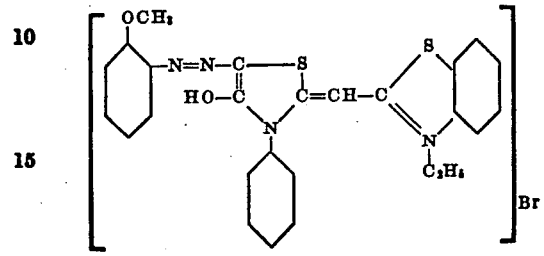

3. The azo dye having the formula:

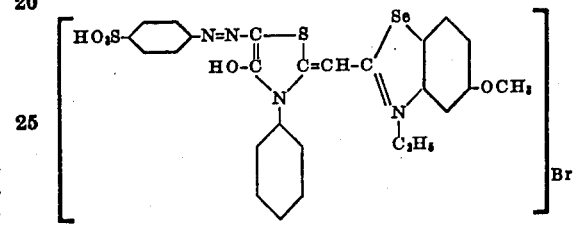

4. The azo dye having the formula:

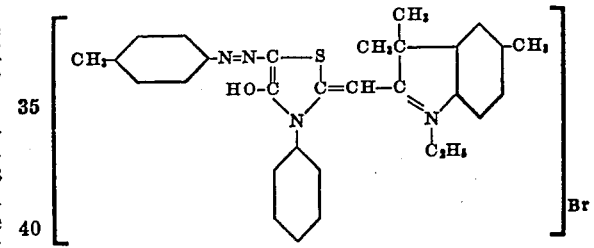

THOMAS R. THOMPSON.

REFERENCES CITED

The following references are of record in the file of this patent:

UNITED STATES PATENTS

| Number | Name | Date |
| --- | --- | --- |
| 2,265,907 | Kendall | Dec. 9, 1941 |
| 2,427,910 | Kendall et al. | Sept. 23, 1947 |